US012347990B2

(12) United States Patent
Nelson et al.

(10) Patent No.: US 12,347,990 B2
(45) Date of Patent: Jul. 1, 2025

(54) TRANSMISSION AND DISTRIBUTION LINE TAP-CONNECTOR REMOVAL TOOL

(71) Applicants: Chase Nelson, Turlock, CA (US); Michael Nelson, Turlock, CA (US)

(72) Inventors: Chase Nelson, Turlock, CA (US); Michael Nelson, Turlock, CA (US)

( * ) Notice: Subject to any disclaimer, the term of this patent is extended or adjusted under 35 U.S.C. 154(b) by 193 days.

(21) Appl. No.: 17/683,330

(22) Filed: Feb. 28, 2022

(65) Prior Publication Data

US 2023/0033593 A1 Feb. 2, 2023

Related U.S. Application Data

(63) Continuation-in-part of application No. 17/390,931, filed on Jul. 31, 2021, now Pat. No. 11,757,242.

(51) Int. Cl.
*H01R 4/50* (2006.01)

(52) U.S. Cl.
CPC ......... *H01R 4/5083* (2013.01); *H01R 4/5075* (2013.01)

(58) Field of Classification Search
CPC ............................ H01R 4/5075; H01R 4/5083
See application file for complete search history.

(56) References Cited

U.S. PATENT DOCUMENTS

| | | | | |
|---|---|---|---|---|
| 5,127,152 | A * | 7/1992 | Meyer | H01R 43/015 29/749 |
| 5,244,422 | A | 9/1993 | Laricchia | |
| 5,507,671 | A | 4/1996 | Chadbourne et al. | |
| 5,538,447 | A | 7/1996 | Chadbourne et al. | |
| 5,679,031 | A | 10/1997 | Chadbourne et al. | |
| 6,047,464 | A | 4/2000 | Chadbourne et al. | |
| 7,426,782 | B2 | 9/2008 | Johnson et al. | |
| 11,757,242 | B2 * | 9/2023 | Nelson | H01R 43/26 29/764 |
| 2010/0003864 | A1 | 1/2010 | Fuzetti et al. | |
| 2023/0033593 | A1 | 2/2023 | Nelson | |
| 2023/0034013 | A1 | 2/2023 | Nelson | |

FOREIGN PATENT DOCUMENTS

| | | |
|---|---|---|
| WO | 2021150986 | 7/2021 |

* cited by examiner

*Primary Examiner* — Minh N Trinh
(74) *Attorney, Agent, or Firm* — Sierra IP Law, PC; William K. Nelson

(57) ABSTRACT

The present invention provides an improved wedge connector removal tool for disconnecting a transmission line wedge tap connection and the methods of using such a tool. The tool may couple to a wedge connector around the transmission lines enabling a lineman's hands to be free from supporting the tool, and the wedge may be removed from the connection without the incorporation of powder charges.

20 Claims, 19 Drawing Sheets

TRANSMISSION AND DISTRIBUTION LINE TAP-CONNECTOR REMOVAL TOOL

FIELD OF THE INVENTION

The present invention relates generally to tools for the removal of transmission line wedge connectors, and methods of using the same. More particularly, the present invention provides a device operable to couple to a wedge connector and dislodge a wedge from a wedge connector sleeve, thereby providing access for replacement or repair of a wedge connector.

BACKGROUND OF THE INVENTION

Transmission lines are a critical component of the electrical power transmission infrastructure. Transmission lines to transport and distribute electrical power over great distances to consumers from many utility providers. A transmission line may be tapped into with a wedge tap connector. A wedge connector has two components a wedge connector sleeve (e.g., "C" member, sleeve) and a wedge that connects a first conductor cable (e.g., main, run, etc.) to a second conductor cable (e.g., tap). An electrical connection is formed by inserting the wedge between the two conductor cables with sufficient force to cause plastic deformation of the sleeve, thereby applying pressure to the cables and wedge. To secure the wedge a charged impact tool (e.g., AMPACT) is used, which drives the wedge into the sleeve. An assembled wedge connector may provide a holding pull-out force of the order of 1200 lbs. and may subject the wedge sleeve to pressures of up to 250 MPa.

The removal process for the assembled wedge is a similar operation, with the impact tool being used to drive the wedge out of the wedge connector. This method of removing the wedge from the sleeve provides ongoing concern with the laborious process using the impact tool, which requires significant manual manipulation of the impact tool and the assembled wedge at dangerous, elevated positions for the lineman. The precarious position and the need for manual manipulation of the wedge and tool creates a hindrance for a lineman to retrieve the additional tools required to secure and utilize the conventional impact tool. Thus, an improved and more efficient transmission line tap connector removal tool is needed.

SUMMARY OF THE INVENTION

The present invention provides an improved transmission line wedge connector removal tool and methods of using such a tool. A wedge connector is operable to couple a transmission line set, where the transmission line set includes a first conductor cable (e.g., main) and a second conductor cable (e.g., tap). A wedge connector consists of a metal wedge located between the main and tap cable situated at opposite ends of a C-shaped metal component that hereinafter is simply referred to as a "sleeve" or "wedge sleeve." The sleeve provides a cavity for receiving the wedge. An electrical connection is formed by inserting the wedge between the two conductor cables with sufficient force to cause plastic deformation of the sleeve, thereby applying pressure to the cables and wedge. Because the wedge connector operates by applying pressure to the cables and sleeve, the wedge and sleeve geometries are complementary, and both have similar geometric constraints. The wedge and sleeve have a substantially tapering geometry that is A-symmetric, where a top surface of both the wedge and sleeve has a larger cross-sectional area than a bottom surface's cross-sectional area. Therebetween the top and bottom surfaces, the cross-section gradually reduces from the top surface to the bottom surface. The thicknesses of the sleeve and wedge may vary depending on manufactures or materials used for construction. The wedge in some embodiments may provide two channels having a substantially constant circular geometry that aligns the transmission line cables such that the pressure distributes proportionally on the sleeve and cables.

The wedge connector removal tool of the present invention decouples the wedge from the sleeve and cables, allowing for repair or replacement of either the transmission lines or the wedge connector. The wedge connector removal tool of the present invention includes an elongated arm having a front surface, a rear surface, a proximal end, a distal end, and a line of symmetry. On the elongated arms distal end, an attachment member may extend perpendicularly out from the elongated arm to a pre-determined distance, and a threaded nut may be secured to the proximal end on the front surface. The attachment member may have at least one hook extending perpendicular from the front surface of the elongated arm. The attachment member may be operable to engage with the wedge sleeve's top surface. The elongated arm aligns centrally with the opening provided by the C-shape of the sleeve and positions the threaded nut in alignment with the centroid of the wedge. With the tool in position, a technician may advance a drive bolt through the threaded nut to interface with the wedge to dislodge and remove it from the C-shaped wedge sleeve. A technician may continue to advance the nut, and the force is distributed along the elongated arms surfaces. In some embodiments on the elongated arms rear surface, a gusset or brace may be aligned with the centerline and provides support operable to absorb the shear force of the tension on the elongated arm created by the advancement of the drive bolt.

In some embodiments, the elongated arm may have a handle on a rear surface operable to provide a gripping surface for a user when anchoring the removal tool to a wedge connector. The handle may secure to a user's tool belt with a rope or other attachment device to prevent the wedge connector from plummeting to the ground when a wedge dislodges from a connector. The elongated arm may have an arch positioned immediately adjacent to the attachment member to prevent interference with the exterior surface of the sleeve and the elongated arm. In such embodiments, the removal tool may align the elongated arm between the C-shaped opening of the wedge connector and the exterior surface opposite to the C-shaped opening.

In one aspect, the present invention provides a device for removing a wedge connector comprising a wedge and a wedge connector sleeve from a transmission line set, the device comprising: an elongated arm with a front surface, a rear surface, a central axis, a distal end having an attachment member, and a threaded nut fixedly secured to a proximal end, at least one hook thereon the attachment member may operable to interface with an exterior surface of the wedge connector sleeve, and a drive bolt operable to translate through the threaded nut and interface with a surface of the wedge, where the advancement of the drive bolt displaces the wedge. At least one hook may be two hooks, a first and second hook symmetrically positioned about the central axis and extends out perpendicularly from the front surface of the attachment member. The first hook and second hook may have a distance of about 3 inches to 4½ inches apart. The sleeve may have a top surface, a bottom surface and maintains a C-shaped cross-section that provides a cavity operable to receive the wedge. The wedge may include a top surface, a bottom surface and may have two lateral channels and a cross-sectional geometry complementary to the cavity of the sleeve. The sleeve and wedge compress two electrical transmission lines. The first hook and second hook may interface with a top surface of the sleeve may be operable to anchor the attachment member to said wedge connector. The elongated arm may be positioned between an opening of the sleeves C-shape. The drive bolt may be positioned under the wedge, and the threaded end may interface with the wedge's bottom surface. The drive bolt may be further operable to dislodges the wedge from the wedge sleeve when advanced through the threaded nut. The elongated arm may have a length from the bottom surface of the threaded nut to the distal end of the attachment arm, where the length may have a range of about 3½ inches to 5 inches. The elongated arm may have a width ranging from about 1 inch to 2½ inches. The at least one hook may have a substantially square geometry, substantially curved, or may be complementary to the top surface of the sleeve. The hook may have a length ranging from about ¾ inch to 1½ inch. The elongated arm may have a spine operable to absorb a force from the drive bolt. The elongated arm, attachment member, and hooks may have a material thickness ranging from ⅛ inch to ⅜ inch.

It is another aspect the present invention provides a method for removing a wedge from a wedge sleeve, thereby uncoupling a wedge connector from a first conductor and second conductor of a transmission line set, the method comprising mounting a wedge connector removal tool, anchoring an attachment member to one surface of the wedge sleeve thereby supporting the removal tool, and positioning a threaded nut under the wedge in a location opposite to the one surface of the wedge sleeve, and driving a drive bolt through the nut thereby applying a force operable to dislodge the wedge from the transmission lines and the wedge sleeve; wherein the attachment member may be attached to an elongated arm on a distal end, and a threaded nut may be attached to the elongated arm on a proximal end, wherein the elongated arm has a front surface, a rear surface, and a central axis. The driving of the drive bolt may be advanced with a driving mechanism. The central axis may define a plane of symmetry for the wedge connector removal tool. The attachment member may be provided in the form of an open-ended bracket having at least one hook with a position orthogonal to the front surface of the elongated arm. The attachment member and the elongated arm may form a T-shape and position the hook perpendicular to the front surface's elongated arms. The threaded nut may have a position centered with the central axis. The one surface of said wedge sleeve may be a top surface having a large cross-section and may further include a second bottom surface having a smaller cross-section, wherein the cross-section may have a substantially C-shape. The cross-section may be substantially C-shape and tapers from the top surface to the bottom surface and provides an opening for the elongated arm to nest therein. The wedge may further have a tapering cross-sectional geometry complementary to the wedge sleeve, and may provide a channel on each periphery of the wedge for securing the transmission line set conductors. The force may be applied to the bottom surface of the wedge and translate the wedge out of the sleeve. The force may be applied as a pressure ranging from 115 MPa to 200 MPa. The elongated arm may have a fixed length in a range from about 4 inches to about 6 inches. The elongated arm may have a uniform width in a range from about ¾ inch to about 1½ inch. The attachment arm may have a width of in a range of about ¾ inch to about 1 ½ inch. The hooks may have a fixed length of in a range of about ⅘ inch to 1½ inch. The hooks may have a substantially square geometry. The hooks may have a substantially curved geometry. The drive bolt may have a length ranging from about 2 inches to about 4 inches. The drive bolt may be coupled to a ratcheting mechanism operable to advance said drive bolt.

It is a further aspect of the present invention to provide a device for removing a wedge connector comprising a wedge and a wedge connector sleeve from a transmission line set, the device comprising: an elongated arm having an inner surface, a handle, a central axis, a distal end having an attachment member, and a threaded nut fixedly secured to a proximal end; at least one engagement structure thereon operable to interface with an exterior surface of said wedge connector sleeve; and a drive bolt operable to translate through said threaded nut and interface with a surface of the wedge, wherein advancement of said drive bolt displaces the wedge. The at least one engagement structure includes at least one hook. The at least one hook may include a first and second hook symmetrically positioned about the central axis and may extend out perpendicularly from the front surface of the attachment member, the first hook and second hook separated by a distance of about 3 inches to 4½ inches. The sleeve may include a top surface, a bottom surface, and maintains a C-shaped cross-section that provides a cavity operable to receive the wedge. The wedge may include a top surface, a bottom surface, and has two lateral channels and a cross-sectional geometry complementary to said cavity of said sleeve. The sleeve and wedge compress two electrical transmission lines. The first hook and second hook are further operable to each interface with a top surface of the sleeve for anchoring the elongated arm to the wedge connector. The elongated arm may position against the wedge sleeve exterior surface opposite to the opening of said sleeves C-shape. The drive bolt may be further positioned under the wedge and the threaded end interfaces with the wedges bottom surface. The drive bolt may be further operable to dislodges the wedge from the wedge sleeve when advanced through the threaded nut. The elongated arm may have a length between a bottom surface of the threaded nut to the distal end of said attachment arm, wherein the length has a range of about 3½ inches to 5 inches. The elongated arm may have a width of in a range of about 3/16 inch to ⅜ inch. The at least one hook may have a substantially square geometry, substantially curved, or is complementary to the top surface of the sleeve. The at least one hook may have a length of at least ¾ inch to 1½ inch. The handle may be operable to provide a gripping surface to a user when positioning the removal tool. The elongated arm, attachment member, handle, and at least one hook may have a thickness in a range of about ⅛ inch to ⅜ inch.

Further aspects and embodiments will be apparent to those having skill in the art from the description and disclosure provided herein.

It is an object of the present invention to provide a removal tool that is operable to remove a wedge connector from a transmission line.

It is an object of the present invention to provide a method for coupling a wedge connector removal tool that is operable to remove a wedge from a wedge connector for replacement or repair of a transmission line or wedge connector.

It is an object of the present invention to provide a wedge connector removal tool that couples to a wedge connector without restraining a lineman's hands.

It is an object of the present invention to provide a wedge connector removal tool that does not require a powder cartridge for dislodging a wedge from a wedge connector.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

The present invention concerns a wedge connector removal tool that may dislodge a wedge from a wedge sleeve, thereby releasing the transmission line sets for replacement or repair of a wedge connector or transmission line cables. FIGS. 1-7 provides an exemplary wedge connector removal tool 1000 according to the present invention. The wedge connector removal tool 1000 may include an elongated arm 1100, having an attachment member 1200, a threaded nut 1300, and a drive bolt 1400. The attachment member 1200 and elongated arm 1100 may form a T-shape frame illustrated in FIG. 2 and FIG. 3. The attachment member may have two hooks, 1210 and 1220, that are operable to provide a ground for the removal tool to anchor. The drive bolt 1400 may have threading 1420 that threads through the threaded nut 1300. The elongated arm may have an interior surface 1100A and exterior surface 1100B. On the exterior surface 1100B of the elongated arm 1100, there may be a spine 1150 operable to absorb force produced by the advancement of the bolt 1400. The removal tool 1000 may maintain symmetry about the plane 1130, illustrated in FIGS. 3 and 6. The elongated arm 1100 may have a width 1140 that ranges from 1 inch to 2½ inches.

Figure 1:
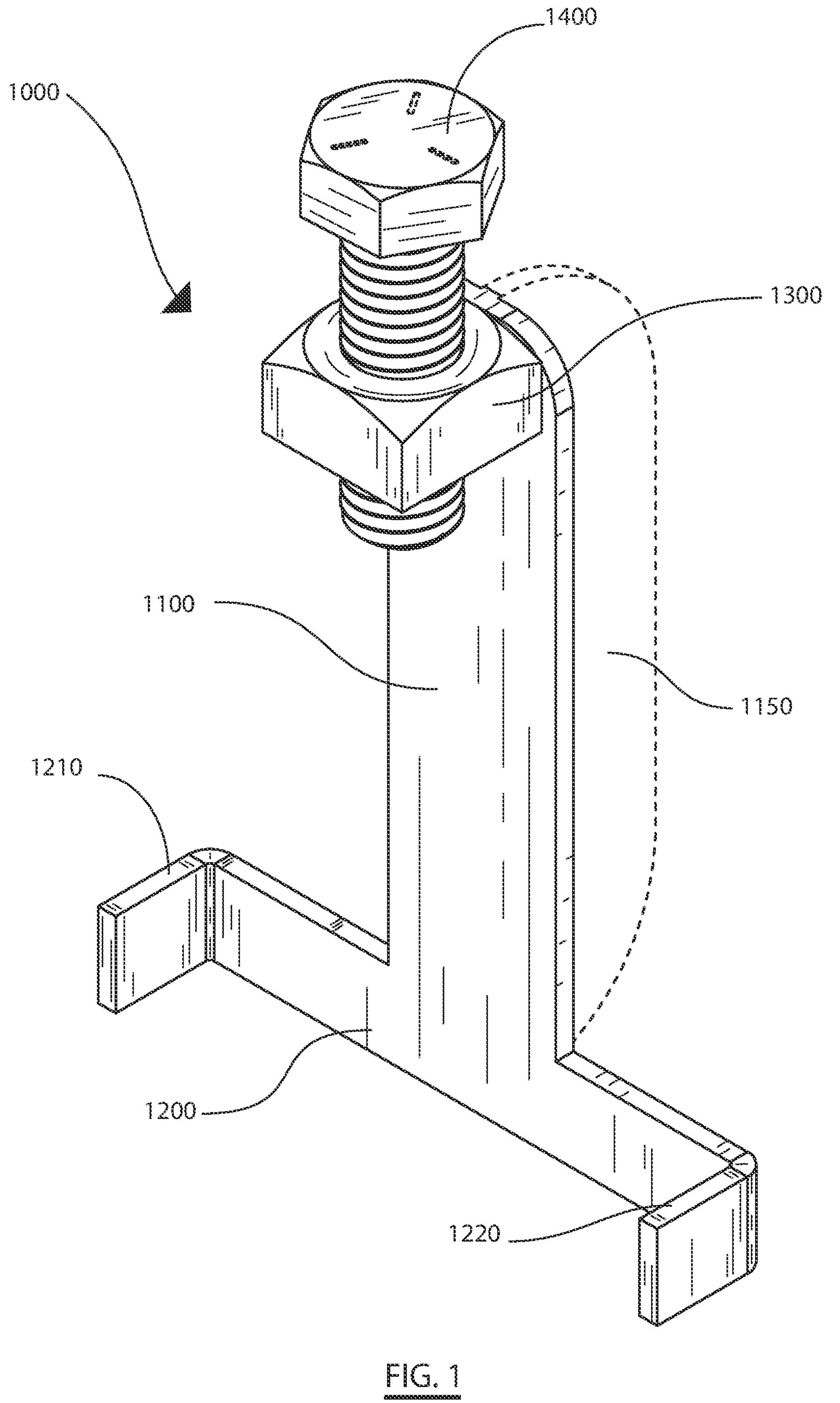
FIG. 1 provides a perspective view of a wedge connector removal tool, according to an embodiment of the present invention.
Figure 2:
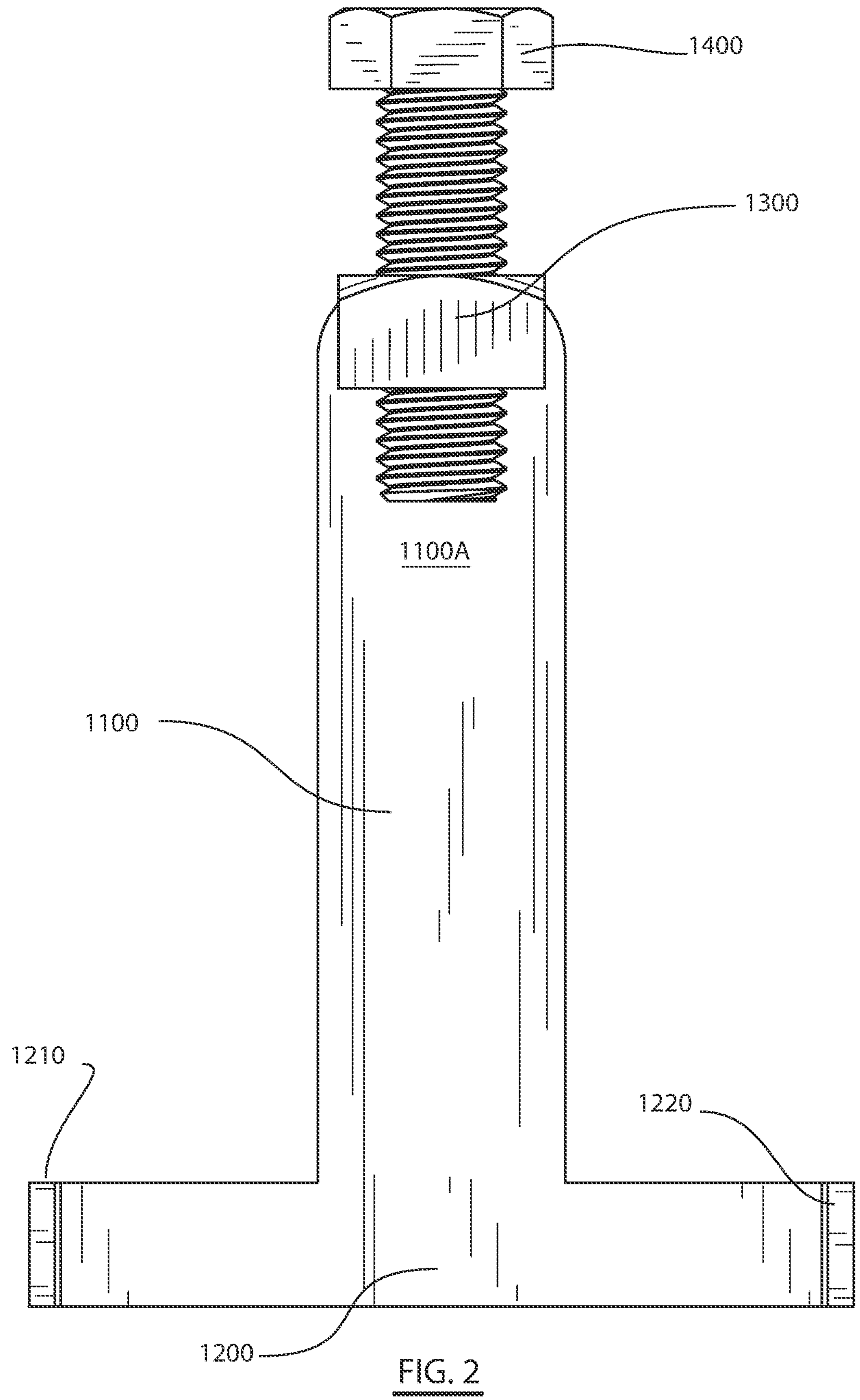
FIG. 2 provides a front view of a wedge connector removal tool, according to an embodiment of the present invention.
Figure 3:
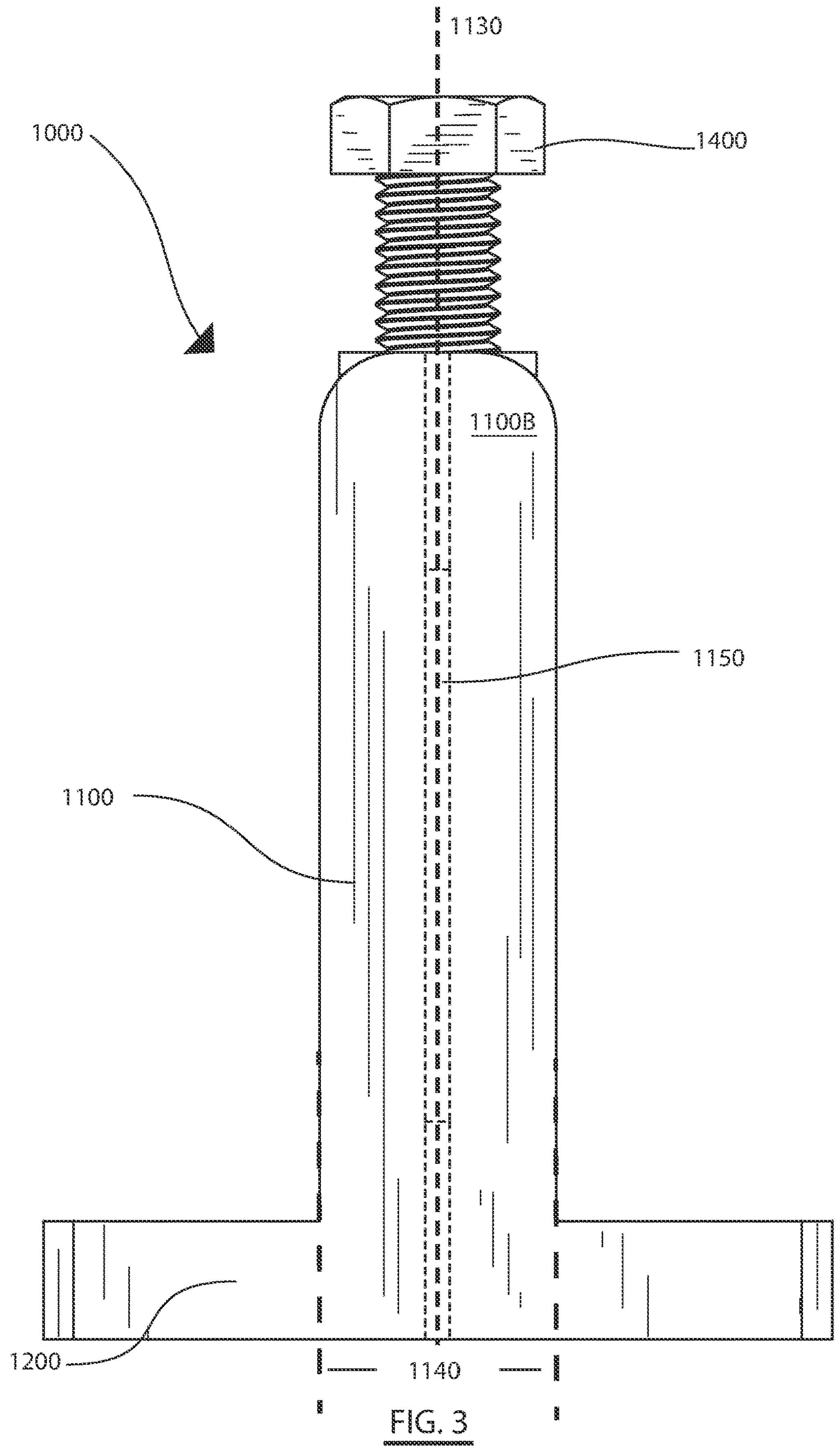
FIG. 3 provides a rear view of a wedge connector removal tool, according to an embodiment of the present invention.
Figure 4:
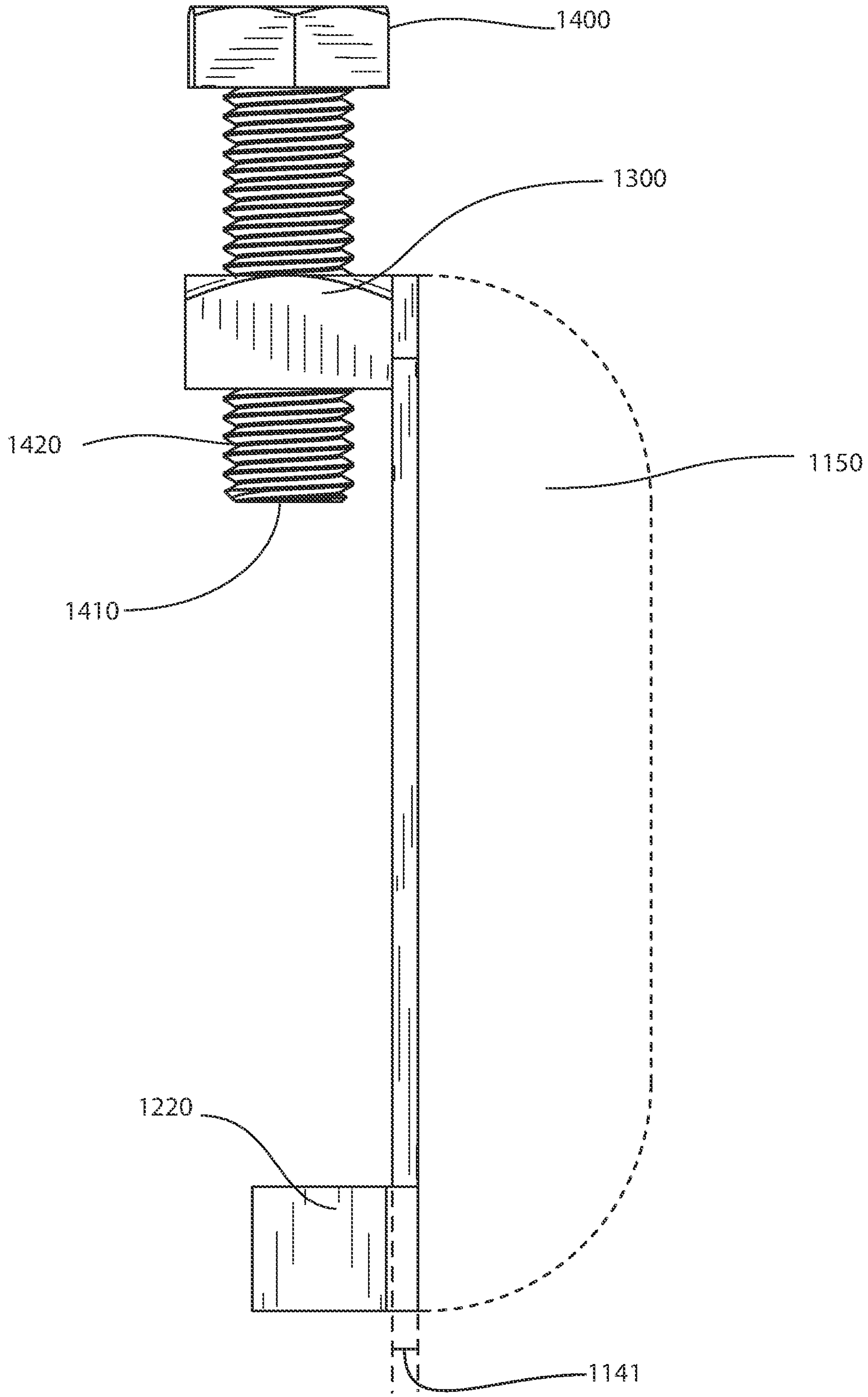
FIG. 4 provides a side view of a wedge connector removal tool, according to an embodiment of the present invention.
Figure 5:
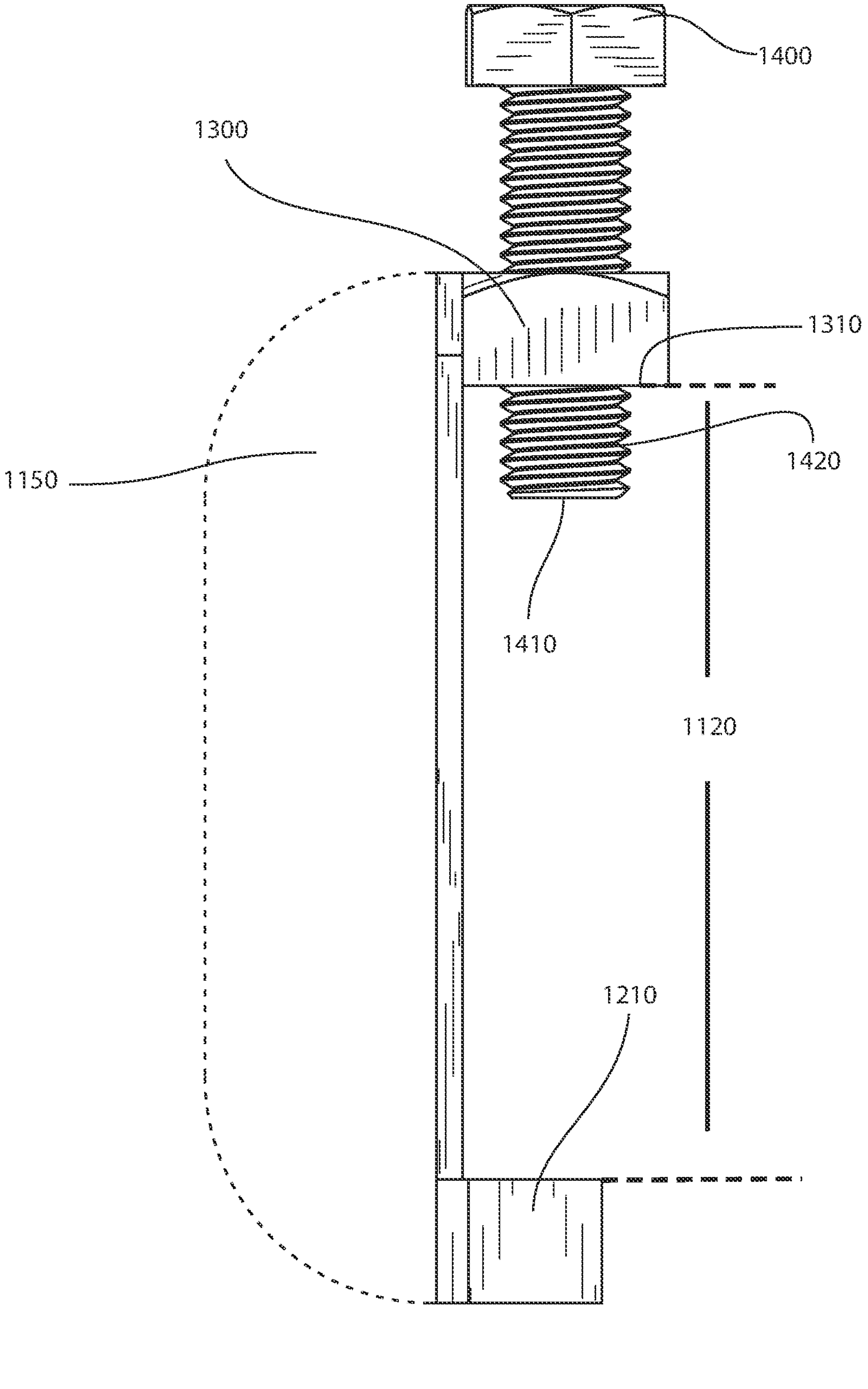
FIG. 5 provides a side view of a wedge connector removal tool, according to an embodiment of the present invention.
Figure 6:
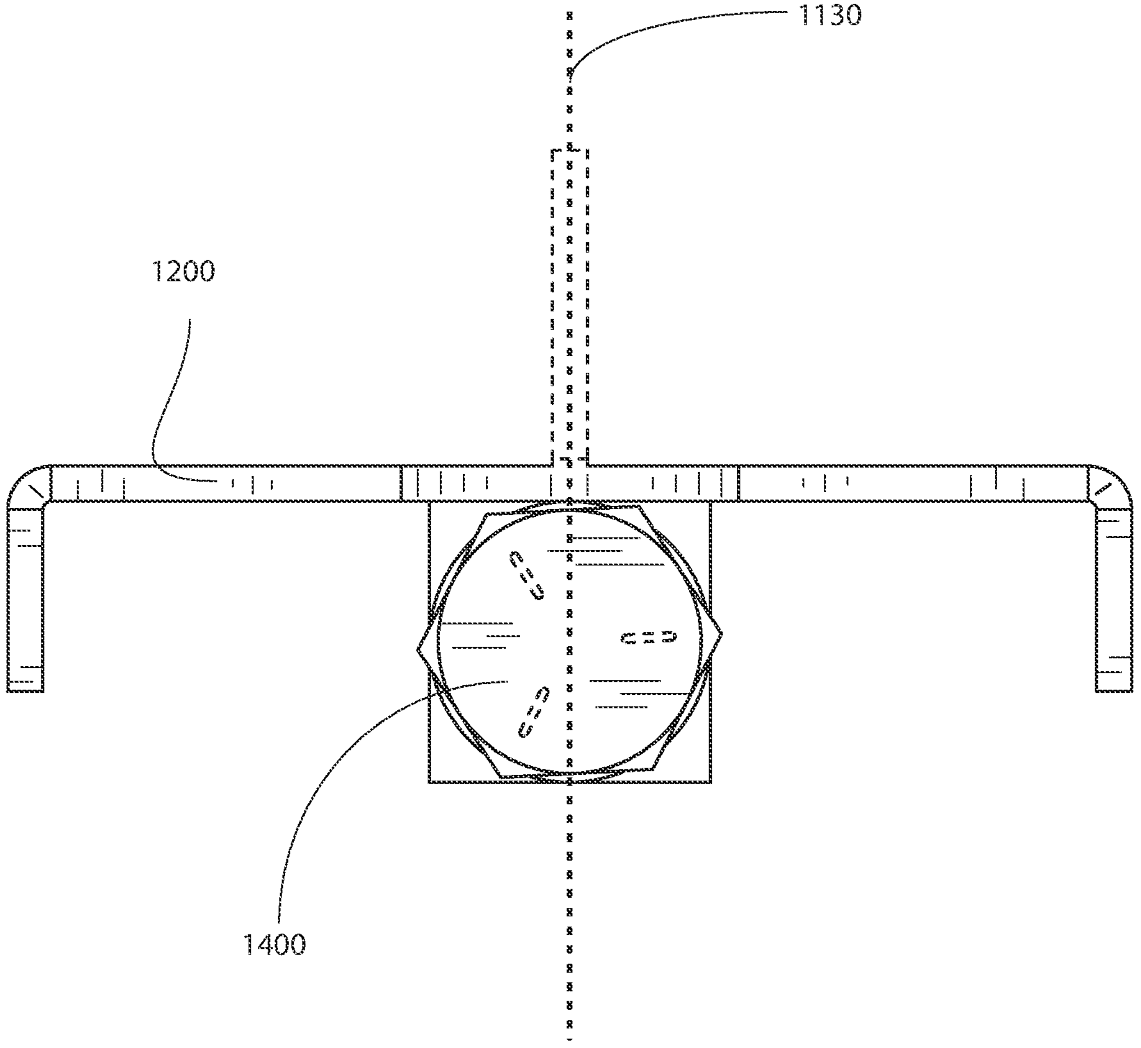
FIG. 6 provides a top view of a wedge connector removal tool, according to an embodiment of the present invention.
Figure 7:
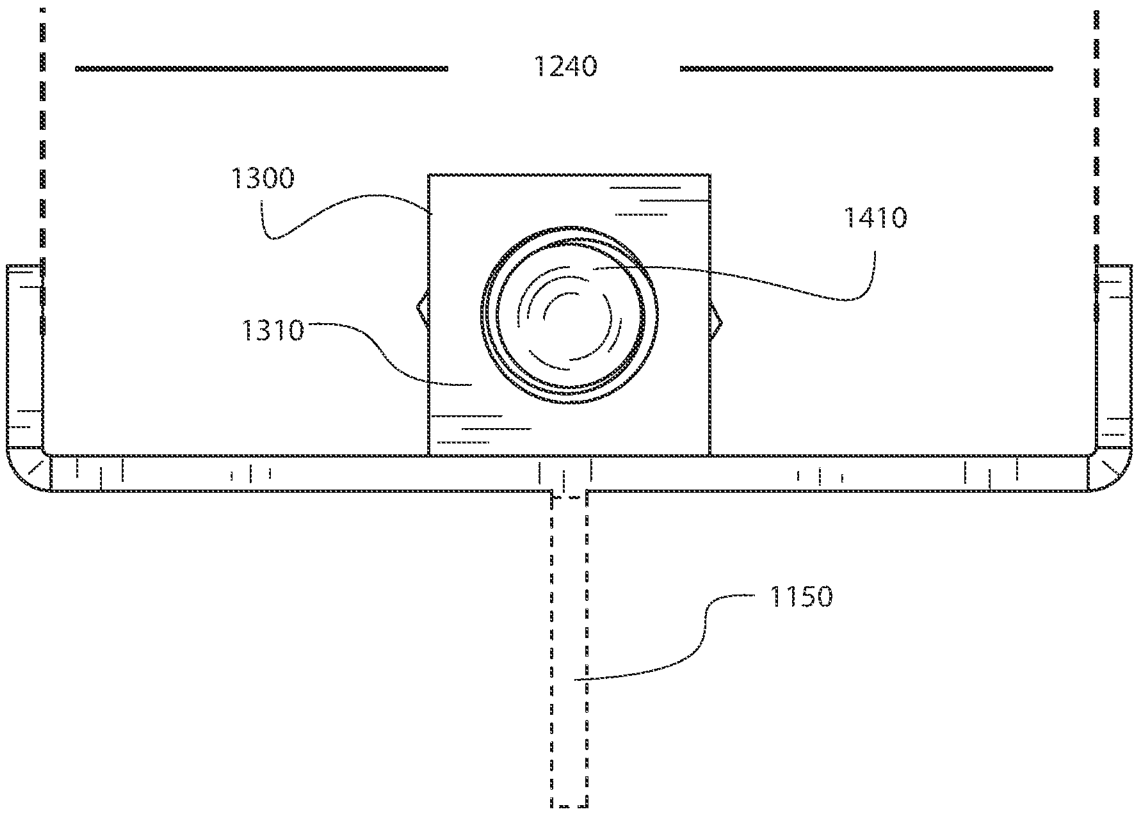
FIG. 7 provides a bottom view of a wedge connector removal tool, according to an embodiment of the present invention.

The elongated arm 1100 may have a length 1120, shown in FIG. 5. The length 1120 may span from the bottom surface 1310 of the threaded nut to the hooking interface 1210, 1220 and provides a space for anchoring tool 100 to the wedge 2000. The length 1120 may range from 3½ inches to 5 inches apart. The attachment member 1200 may have a distance 1240 that defines a distance between each hook in the attachment member. The hooks 1210, 1220 preferably interface with wedge sleeves top surface 2102 around the transmission lines. The distance 1240 may range from about 3 inches to about 4½ inches. The elongated arm 1100, attachment member 1200, and hooks 1210, 1220 may have a thickness 1141 ranging from ⅛ inch to ⅜ inches.

Figure 8:
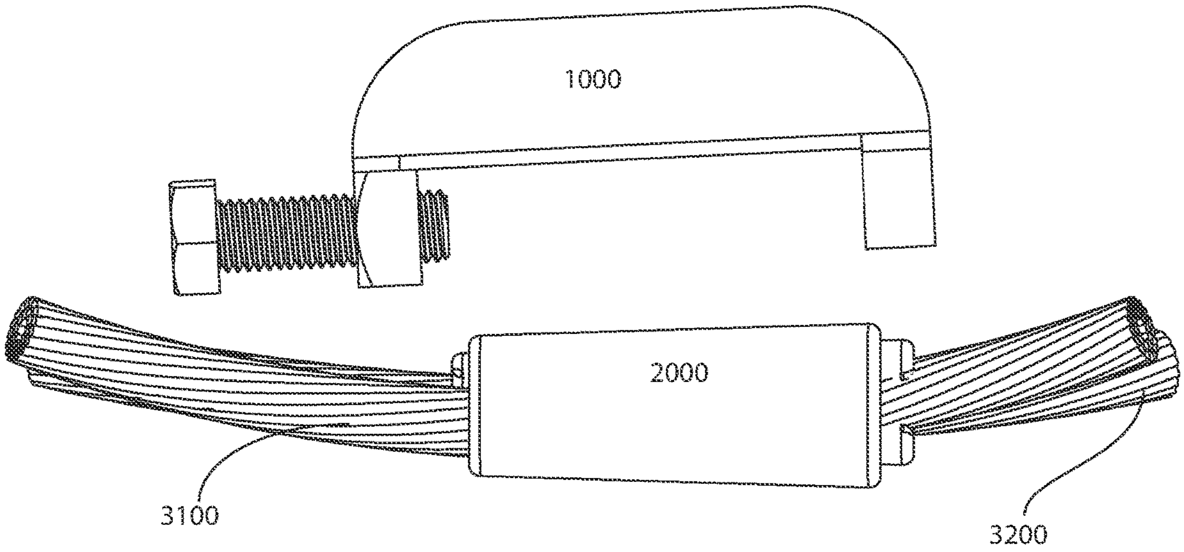
FIG. 8 provides an exemplary environmental side view of a wedge connector removal tool according to an embodiment of the present invention.
Figure 12:
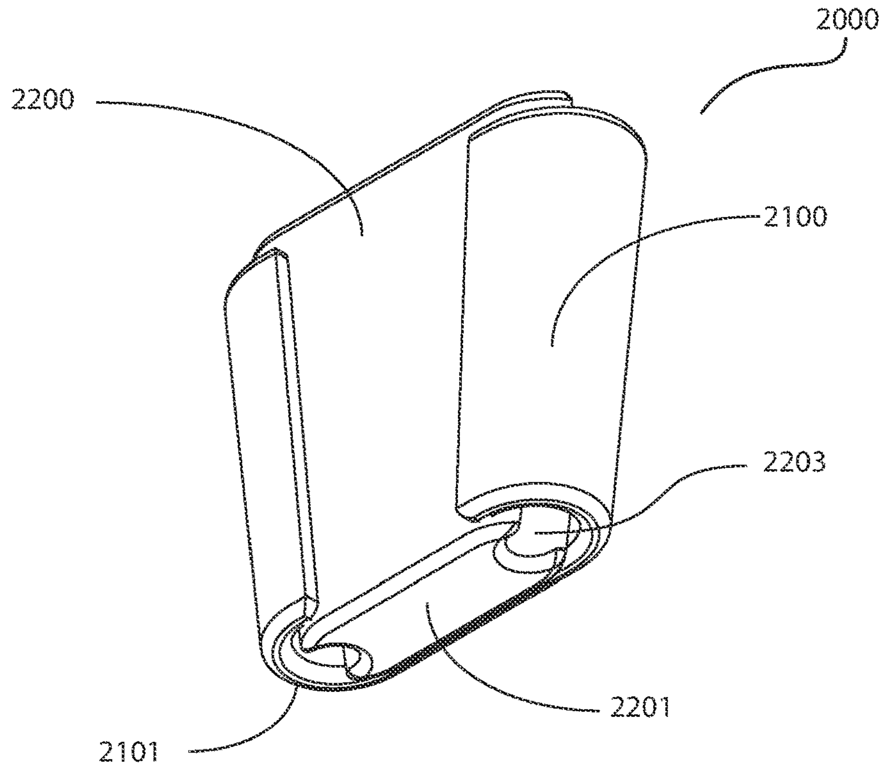
FIG. 12 provides an exemplary view of a wedge connector, according to an embodiment of the present invention.
Figure 13:
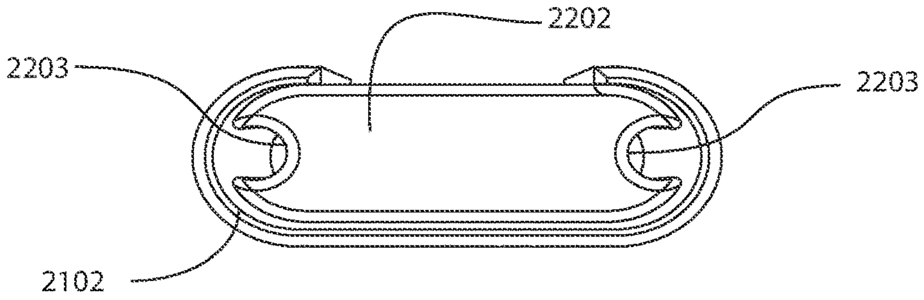
FIG. 13 provides an exemplary view of a wedge connector, according to an embodiment of the present invention.

An exemplary wedge connector 2000 is illustrated in FIGS. 12 and 13, the wedge connector comprises at least two parts, a wedge sleeve 2100 and a wedge 2200. Both have complementary geometries that are operable to join transmission lines. The wedge sleeve 2100 has a cross-section that may be substantially C-shaped. The C-shape allows the wedge sleeve to plastically deform and frictionally hold the transmission lines when wedge 2200 is inserted. The wedge sleeve 2100 may have a top surface 2102 with a larger cross-section and may provide a bottom surface 2101 having a smaller cross-section 2101 with less area. The wedge 2200 may be inserted from at the top surface 2102 and may compress two transmission lines in the wedge sleeve 2101. The wedge 2200 has a complementary geometry to the wedge sleeve 2100 and may have a top surface 2202 with a larger cross-section and a bottom surface 2201 with a smaller cross-section. The wedge 2200 also provides two lateral channels 2203 symmetrically position about a centerline of the wedge. The wedge connector 2000 may be manufactured from aluminum and aluminum-copper alloys, with mechanical properties that are highly conductive. The channels 2203 may have a substantially circular geometry for receiving each of the transmission lines for coupling. An assembled wedge connector 2000 securing two transmission lines 3100, 3200 is illustrated in FIG. 8.

Figure 9:
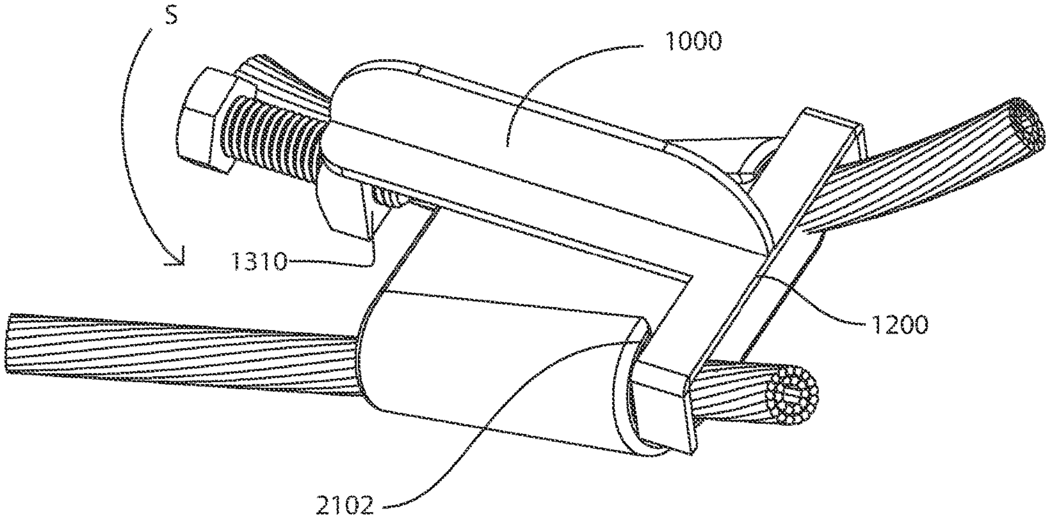
FIG. 9 provides an exemplary environmental view of a wedge connector removal tool being secured to a wedge connector, according to an embodiment of the present invention.
Figure 10:
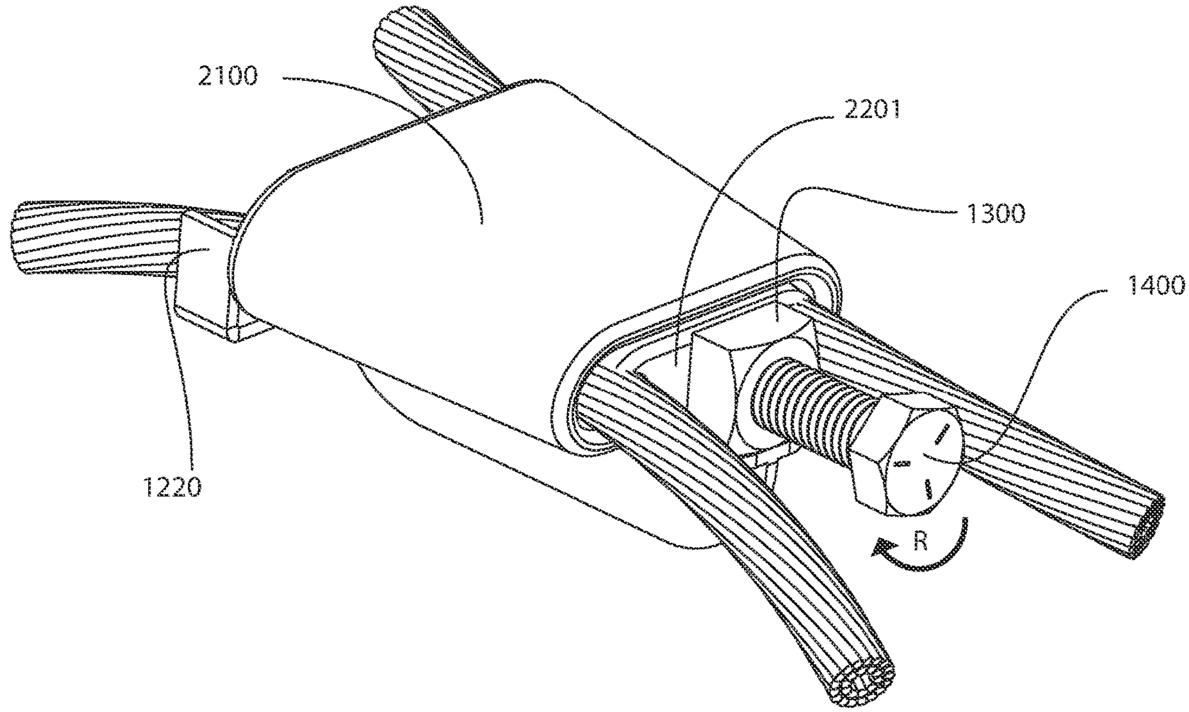
FIG. 10 provides an exemplary environmental view of a wedge connector removal tool secured to a wedge connector, according to an embodiment of the present invention.
Figure 11:
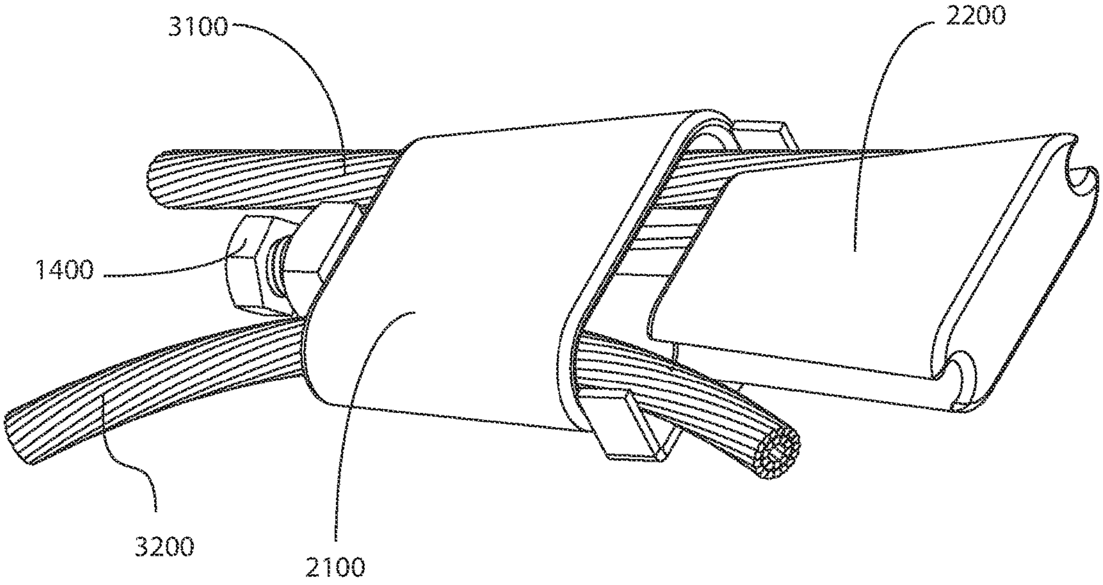
FIG. 11 provides an exemplary environmental view of a wedge connector removal tool secured to a wedge connector, according to an embodiment of the present invention.

The present invention provides a method for removing a wedge connector 2000 from a transmission line set 3000. The transmission line set may include a first conductor line 3100, and a second conductor line 3200. FIG. 8 shows an assembled wedge connector securing a first and second conductor lines 3100, 3200 between the wedge 2200 and wedge sleeve connector 2100. The wedge removal tool 1000 is not anchored to the wedge connector 2000 in this illustration. FIG. 9 provides an illustration of the first steps for anchoring the wedge removal tool 1000 to the wedge connector 2000. The attachment member 1200 interface with the wedge connectors top surface 2102 with the hooks of the attachment member 1210 and 1220 wrap around the transmission lines 3100, 3200 and the elongated arm 1100 may be positioned between the opening provided by the wedge sleeves 2100 C-shape as the tool rotates into position in the direction S. The tools rotation S positions a bottom surface 1310 of the nut 1300 with the bottom surface of the wedge, as illustrated in FIG. 10. Accordingly, the removal tool 1000 is properly secured when the hook 1220 of the attachment member 1200 interfaces with the top surface 2102 of the wedge sleeve 2100 and the bottom surface of the nut 1310 is in a position adjacent to the bottom surface of the wedge 2201. The drive bolt 1400 may be advanced through the nut 1300 and the drive bolts interfacing surface 1410 may apply a force to the wedges bottom surface 2202 that is sufficient to dislodge from the wedge 2200 from the sleeve 2100, as illustrated in FIG. 11. The drive bolt 1400 is advance through the nut 1300 in the direction R.

The drive bolt 1400 may be advanced with a wrench, ratchet, impact driver, or impact wrench. In some embodiments, the elongated arm 1100 may have a longer length than the span of the wedge connector's 2000 top and bottom surfaces. In such embodiments, the selected drive bolt 1400 may have a length equal to the length of the elongated arm 1200.

Figure 14:
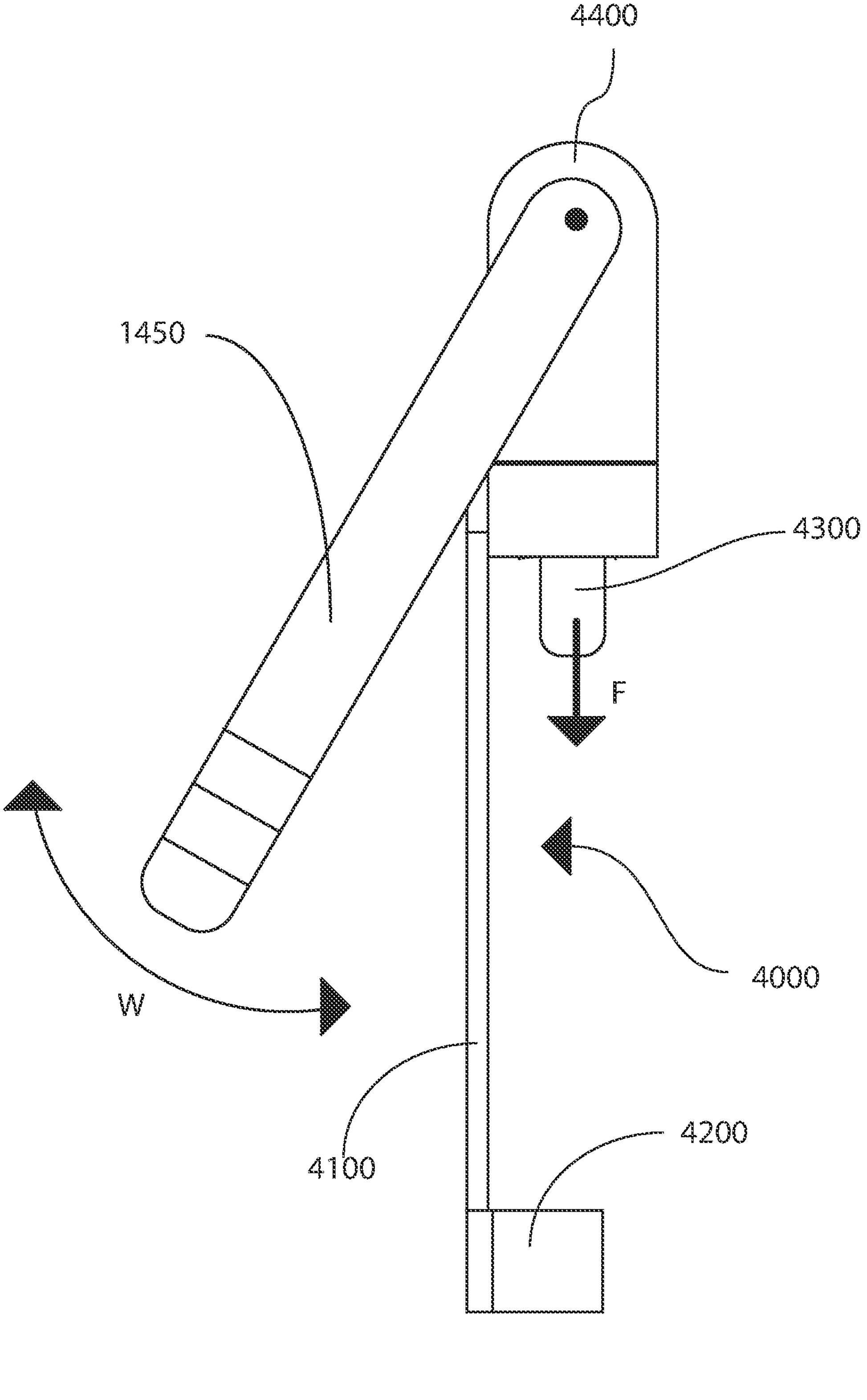
FIG. 14 provides an exemplary wedge connector removal tool, according to an embodiment of the present invention.
Figure 15:
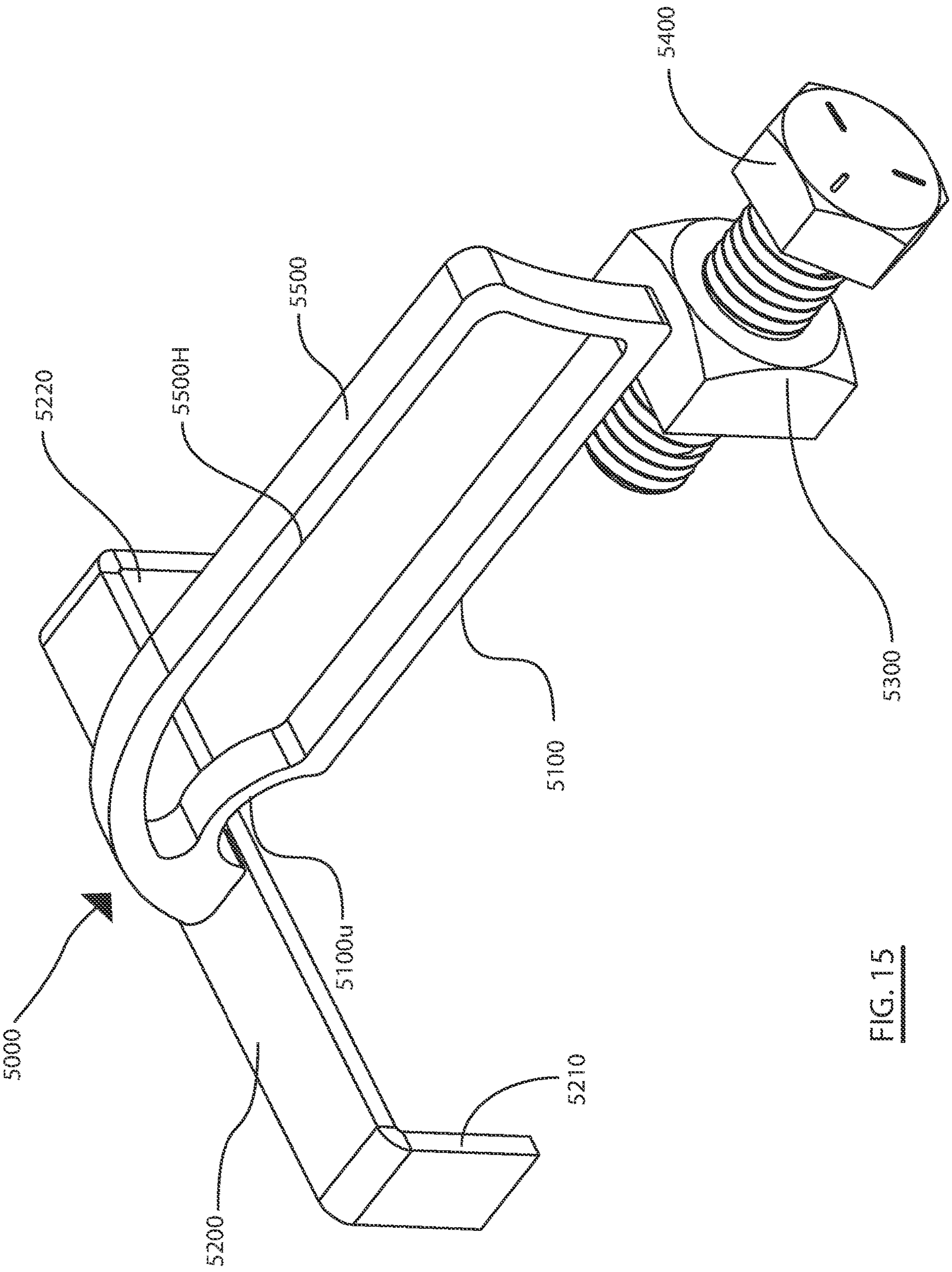
FIG. 15 provides a perspective view of a wedge connector removal tool, according to an embodiment of the present invention.

In other embodiments, the drive bolt 1400 and nut 1300 may be replaced with a linear actuator such as a linear solenoid or pneumatic actuator. In yet other embodiments, the drive bolt 1400, nut 1300, and advancement tools may be replaced with an integrated drive mechanism, as illustrated in FIG. 14. In such embodiments, the advancement tool may have a lever 1450 that is operable to drive a pin 4300, the driving mechanism 4400, may be an integrated linear ratchet that when the lever is pumped in the direction W the pin 4300 elongates out of the drive mechanism and applies a force F to the bottom surface of the wedge 2200. In other embodiments, the driving mechanism may be a hydraulic power drive that is actuated with the lever 1450.

Figure 16:
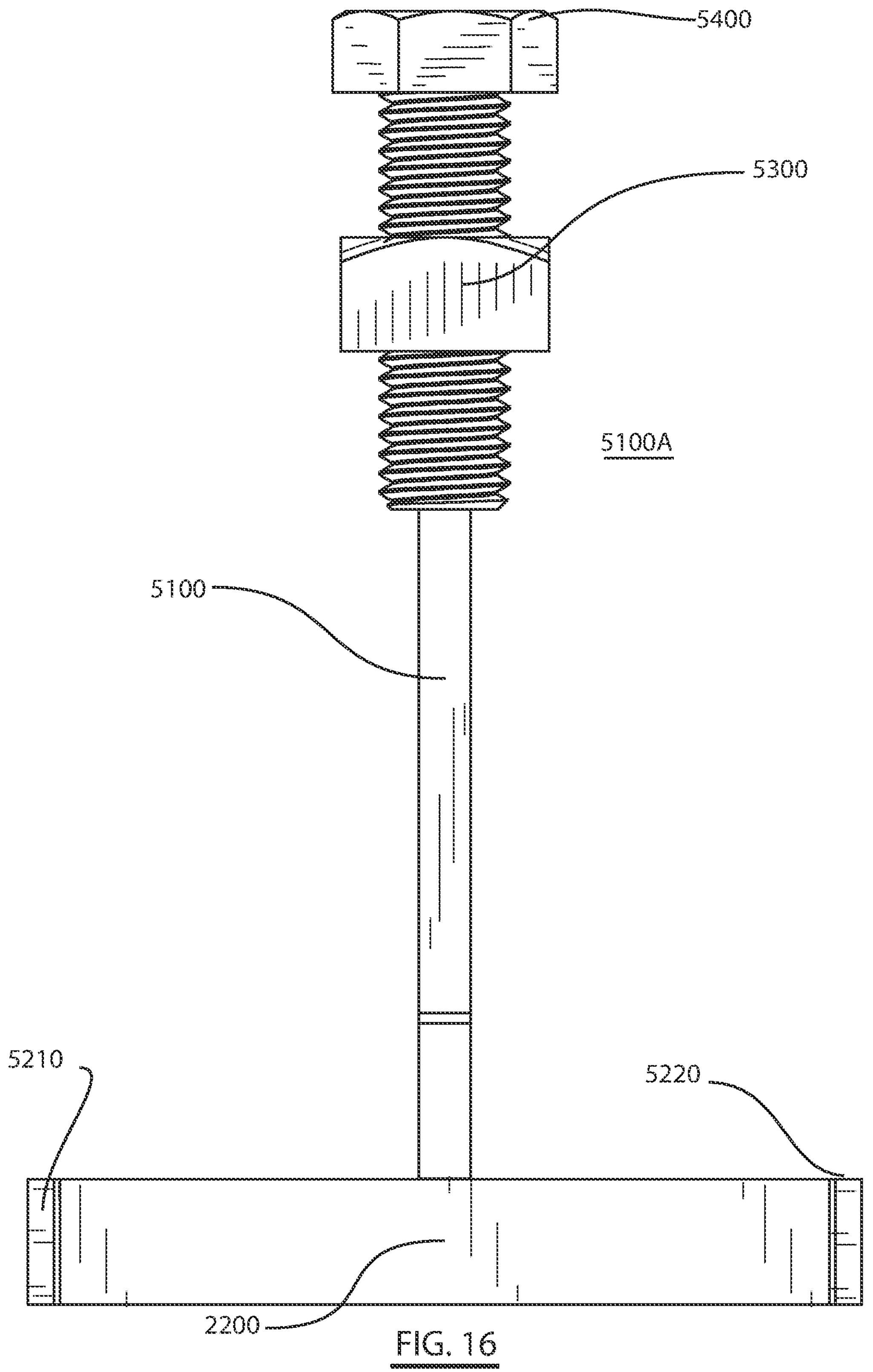
FIG. 16 provides a front view of a wedge connector removal tool, according to an embodiment of the present invention.
Figure 17:
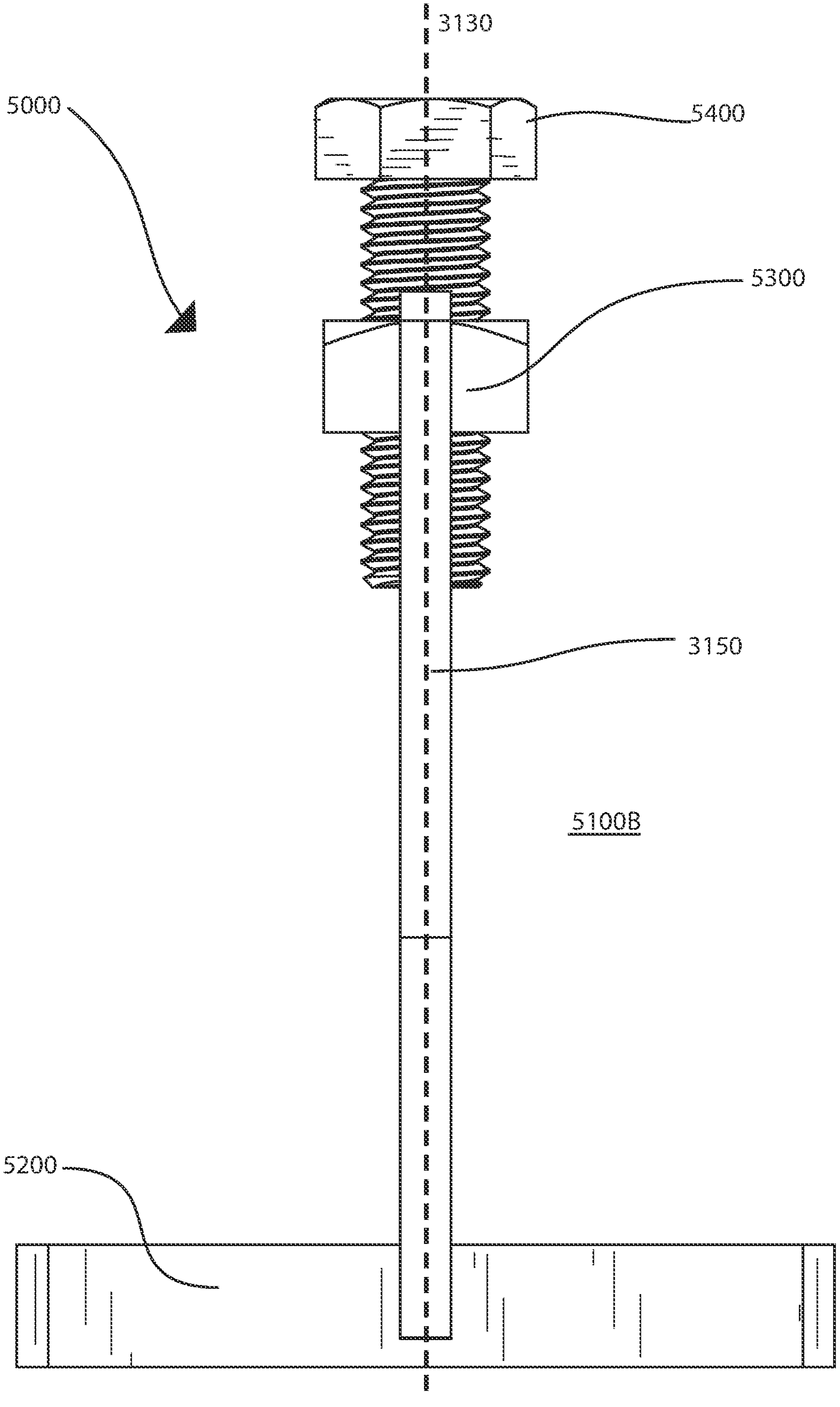
FIG. 17 provides a rear view of a wedge connector removal tool, according to an embodiment of the present invention.
Figure 18:
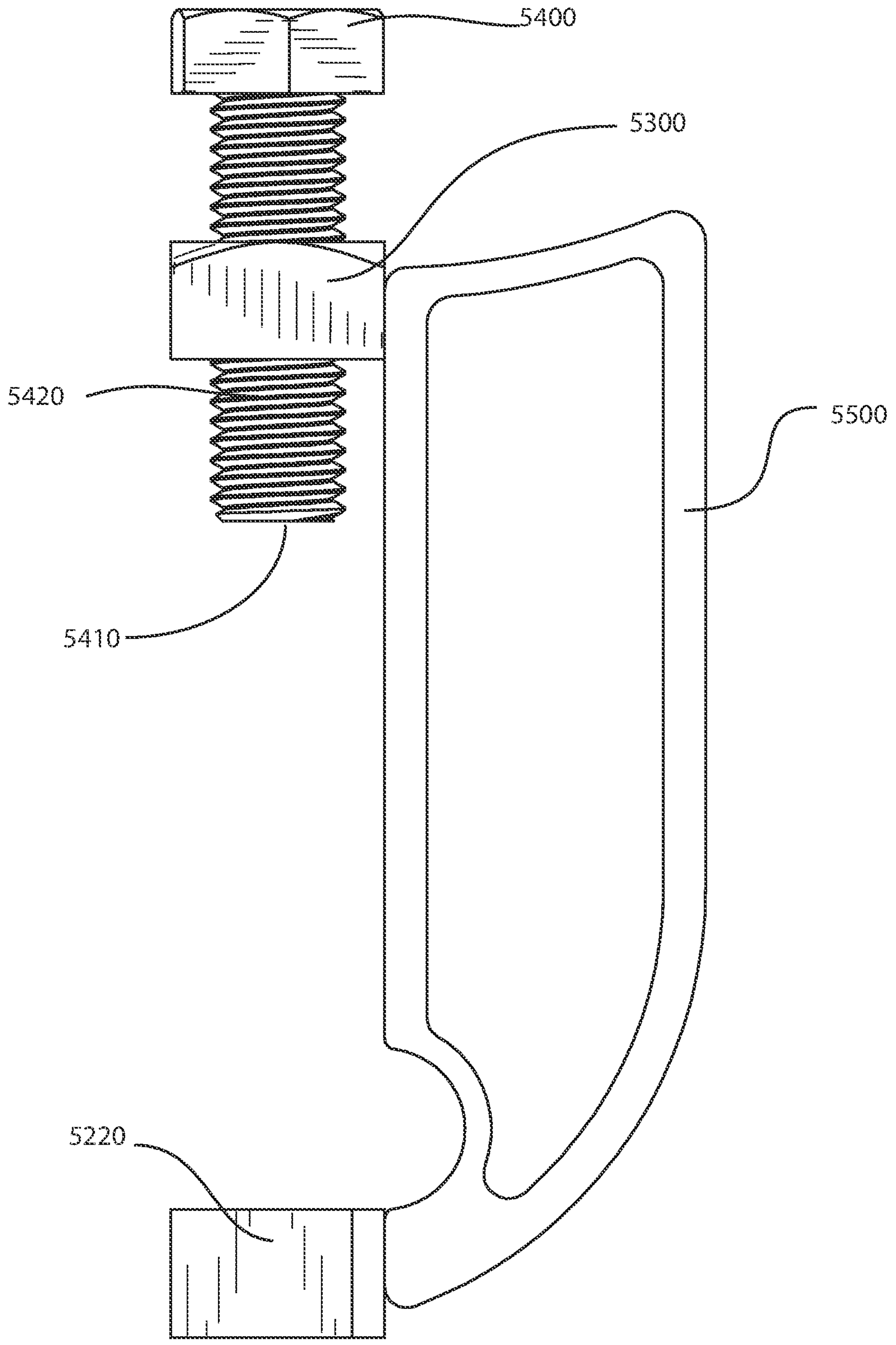
FIG. 18 provides a side view of a wedge connector removal tool, according to an embodiment of the present invention.
Figure 19:
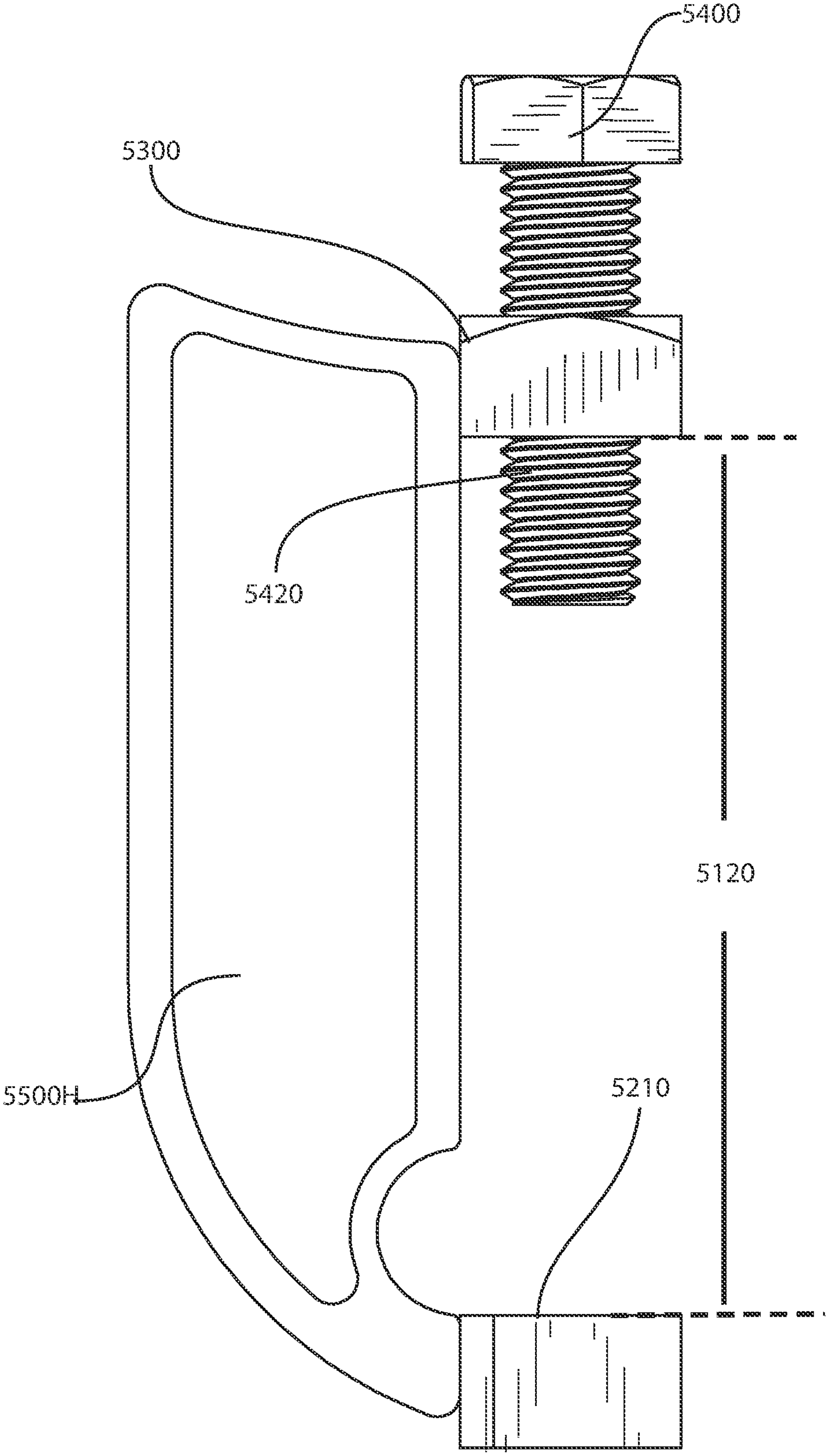
FIG. 19 provides a side view of a wedge connector removal tool, according to an embodiment of the present invention.
Figure 20:
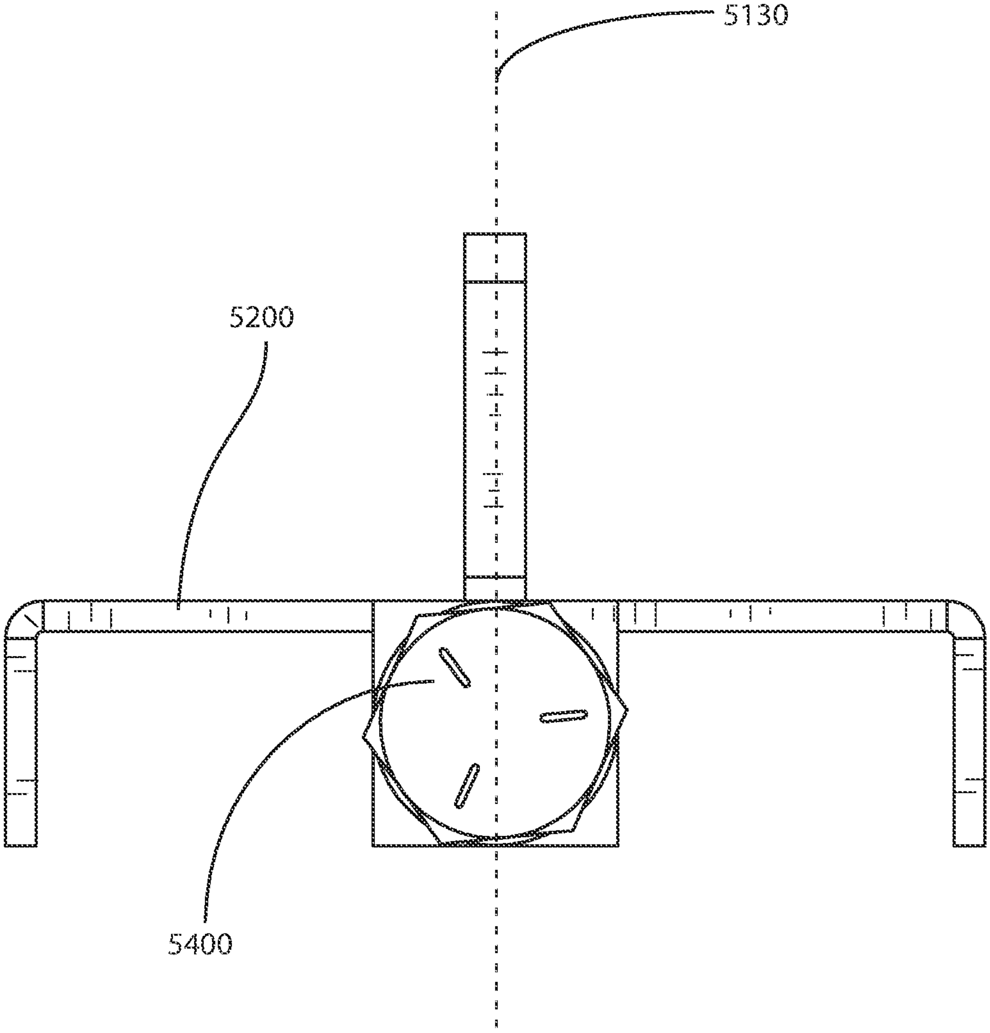
FIG. 20 provides a top view of a wedge connector removal tool, according to an embodiment of the present invention.
Figure 21:
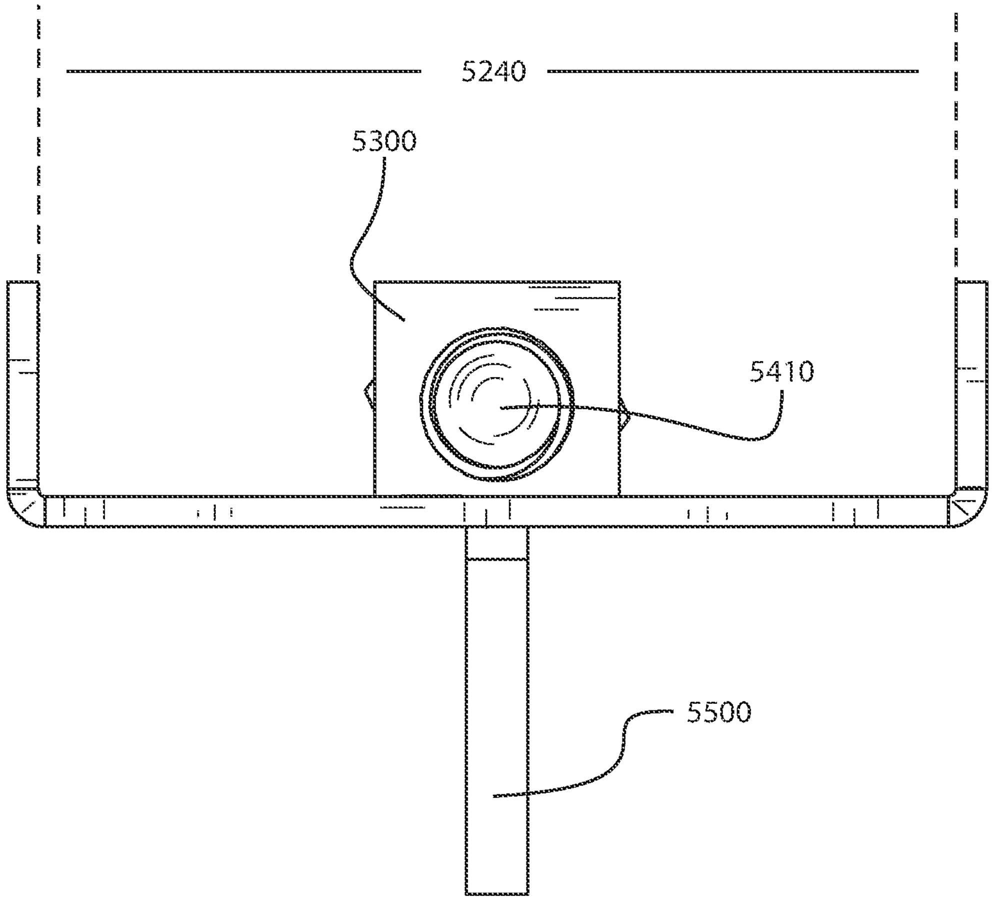
FIG. 21 provides a bottom view of a wedge connector removal tool, according to an embodiment of the present invention.
Figure 22:
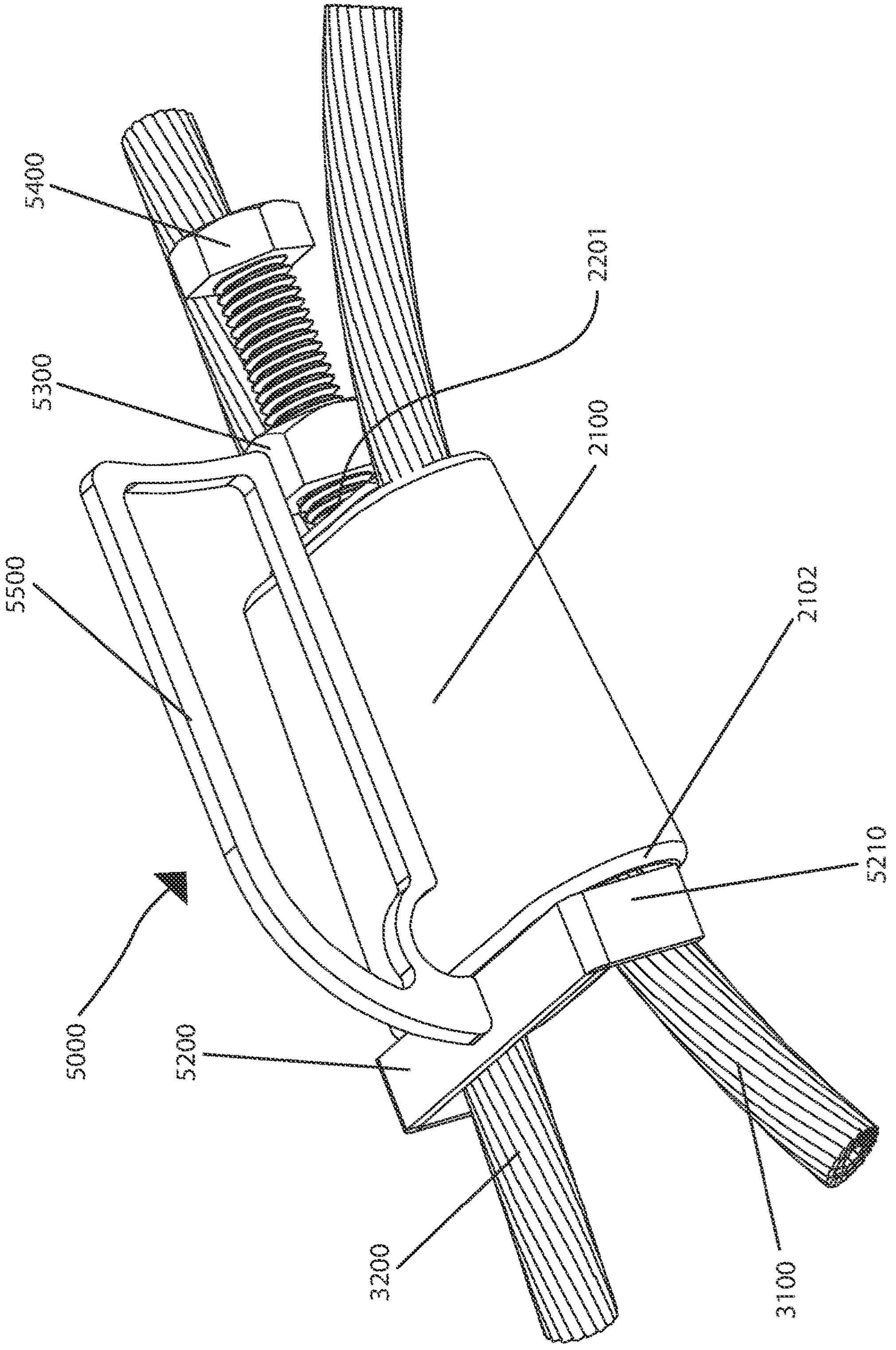
FIG. 22 provides an exemplary environmental perspective view of a wedge connector removal tool, according to an embodiment of the present invention.

In some embodiments, as illustrated in FIGS. 15-21 the wedge connector removal tool 5000 may include an elongated arm 3100 and handle 5500, having an attachment member 5200, a threaded nut 5300, and a drive bolt 5400. The attachment member 5200 and elongated arm 5100 may provide a frame having a substantially T-shape as illustrated in FIGS. 16-17, the attachment member 5200 may have two hooks 5210, 5220 positioned on opposite sides of the attachment member about a centerline 3130 of the wedge connector as illustrated in FIG. 17. The two hooks 5210, 5220 are operable to provide an anchoring surface for the removal tool 5000 to engage against the wedge sleeve 2100. The drive bolt 5400 may have threading 5420 that engages with the threading of the nut 5300. The elongated arm 5100 may have an inner side 5100A and an outer side 5100B, the inner side may correspond to the nut 5400 and the hooks 5210, 5220, and the outer side includes the handle 5500. The handle 5500 may have an interior space 5500H to provide a gripping surface for the user. The elongated arm 5100 may have an arch 5100*u* positioned immediately adjacent to the attachment member 5200 on the inner side 5100A, and the arch 5100*u* may have a semicircular geometry that prevents interference with the wedge sleeve 2100 when attaching the wedge connector removal tool 5000 to the wedge connector 2000. The elongated arm 5100 may secure the attachment member 5200 on the outer surface of the attachment member and may attach the drive bolt 5400 to the side opposite to the attachment member 5200 on the inner side 5100A of the elongated arm 5100.

In such embodiments, wedge connector removal tool 5000 may attach and disassemble the wedge connector 2000 similarly to the method described in FIGS. 8-11. The hooks 5210 and 5220 may anchor to the removal tool 5000 to the wedge connector sleeve top surface 2102 and wrap around the transmission lines 3100, 3200. The attachment member 5200 may be configured on either side the wedge sleeve 2100 outer surface (e.g., the exterior surface opposite to C-shape opening) and the wedge sleeve opening. The nut 5300 may align with the bottom surface of the wedge and the drive bolt 5400 may be advanced through the nut 5300 and apply a force to the wedges bottom surface 2202 such that the wedge dislodges from the sleeve 2100. The handle 5500H may be operable to receive a carabiner or other attachment system to prevent the removal tool 5000 from dropping onto the ground after dislodging the wedge.

CONCLUSION/SUMMARY

The present invention provides an improved wedge connector removal tool and method of using such a tool that is operable to dislodge a wedge from a transmission line connection without using a powder cartridge. The present wedge removal tool is able to couple to a wedge connector around the transmission lines such that a lineman's hands are unrestrained to supporting the tool. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A wedge connector removal tool for removing a wedge connector that includes a wedge and a wedge connector sleeve from a transmission line set,-comprising:

an elongated arm;

an attachment member attached to a distal end of said elongated arm; and a bolt guide fixedly secured to a proximal end of said elongated arm, wherein said attachment member is operable to interface with an exterior surface of said wedge connector sleeve and said attachment member extends laterally from said elongated arm such that it does not obstruct the wedge positioned in said wedge connector sleeve; and a drive bolt operable to translate through said bolt guide and interface with a surface of said wedge, wherein advancement of said drive bolt displaces the wedge from the wedge connector sleeve.

2. The wedge connector removal tool of claim 1, wherein said drive bolt is positioned under said wedge and interfaces with a bottom surface of said wedge.

3. The wedge connector removal tool of claim 1, further comprising a handle that is operable to provide a gripping surface to a user while positioning said removal tool.

4. The wedge connector removal tool of claim 1, wherein said drive bolt is operable to be advanced with a rotating driving mechanism.

5. The wedge connector removal tool of claim 1, wherein said wedge connector sleeve has a top surface, a bottom surface, and maintains a C-shaped cross-section that provides a cavity operable to receive said wedge, wherein said attachment member interfaces with a top surface of said wedge connector sleeve.

6. The wedge connector removal tool of claim 1, wherein said attachment member and said elongated arm form a T-shape and positions said attachment member includes a protrusion perpendicular to a surface of said elongated arm.

7. The wedge connector removal tool of claim 1, wherein said drive bolt is further coupled to a ratcheting mechanism operable to advance said drive bolt.

8. The wedge connector removal tool of claim 1, wherein said drive bolt is threaded and is operable to be advanced through a threaded nut of said bolt guide.

9. The wedge connector removal tool of claim 1, wherein said drive bolt is operable to apply a force to said wedge with a pressure ranging from 115 MPa to 200 MPa.

10. A removal tool for removing a wedge connector comprising a wedge and a wedge connector sleeve from a transmission line set, the removal tool comprising:

a. an elongated arm having an inner surface, a handle, a central axis, a distal end having an attachment member, and a drive bolt guide fixedly secured to a proximal end, wherein said attachment member is lateral to said central axis and operable to interface with an exterior surface of said wedge connector sleeve; and b. a drive bolt operable to translate through said drive bolt guide and interface with a surface of said wedge, wherein advancement of said drive bolt displaces the wedge from the wedge connector sleeve.

11. The removal tool of claim 10, wherein said attachment member interfaces with a top surface of said wedge connector sleeve, said wedge connector sleeve has a top surface, a bottom surface, and maintains a C-shaped cross-section that provides a cavity operable to receive said wedge.

12. The removal tool of claim 10, wherein said sleeve and wedge compresses two electrical transmission lines.

13. The removal tool of claim 10, wherein said drive bolt is further positioned under said wedge and proximal end of said drive bolt interfaces with a bottom surface of said wedge.

14. The removal tool of claim 10, wherein said handle is operable to provide a gripping surface to a user when positioning said removal tool.

15. The removal tool of claim 10, wherein said attachment member and said elongated arm form a T-shape and said attachment member includes a protrusion perpendicular to a surface of said elongated arm.

16. The removal tool of claim 10, wherein said drive bolt is further coupled to a ratcheting mechanism operable to advance said drive bolt.

17. The removal tool of claim 10, wherein said drive bolt is threaded and is operable to be advanced through a threaded nut of said bolt guide.

18. A removal tool for removing a wedge connector comprising a wedge and a wedge connector sleeve from a transmission line set, the removal tool comprising:

a. an elongated arm having a central axis, a distal attachment member, and a drive bolt guide fixedly secured to a proximal end, wherein said attachment member is lateral to said central axis and operable to interface with a distal surface of said wedge connector sleeve, and said drive bolt guide contacts a proximal end of said wedge connector sleeve; and b. a drive bolt operable to translate through said drive bolt guide and interface with a surface of said wedge.

19. The removal tool of claim 18, wherein said drive bolt is positioned under said wedge and a proximal end of said drive bolt interfaces with a bottom surface of said wedge.

20. The removal tool of claim 18, wherein said handle is operable to provide a gripping surface to a user when positioning said removal tool.

* * * * *